United States Patent [19]

Osanai

[11] 4,317,143
[45] Feb. 23, 1982

[54] TAPE RECORDER

[75] Inventor: Akira Osanai, Hachioji, Japan

[73] Assignee: Olympus Optical Co., Ltd., Tokyo, Japan

[21] Appl. No.: 94,793

[22] Filed: Nov. 16, 1979

[30] Foreign Application Priority Data

Nov. 16, 1978 [JP] Japan .................................. 53-141617

[51] Int. Cl.³ .................... G11B 15/18; G11B 19/06
[52] U.S. Cl. .................................. 360/74.1; 360/137; 242/191
[58] Field of Search ....................... 360/137, 74.1–74.2, 360/74.3, 96.3, 96.4, 72.1, 72.3; 242/201, 189–191

[56] References Cited

U.S. PATENT DOCUMENTS

| | | | |
|---|---|---|---|
| 3,921,220 | 11/1975 | Primosch | 360/72 |
| 4,009,846 | 3/1977 | Coruzzi | 242/201 |
| 4,097,726 | 6/1978 | Satoh et al. | 242/191 X |
| 4,114,830 | 9/1978 | Hoshi et al. | 242/191 |
| 4,139,167 | 2/1979 | Osanai | 242/201 X |

*Primary Examiner*—John H. Wolff

[57] ABSTRACT

A tape recorder comprising pulse generating mechanism for generating an electric or magnetic continuous pulse during the rotation of a reel shaft. The tape recorder further comprises an end-of-tape detection circuit including a timer, and a tape count circuit including a counter, decoder/driver and display unit. The continuous pulse from the pulse generating mechanism is applied to the end-of-tape detection circuit and the tape count circuit as an input signal.

7 Claims, 5 Drawing Figures

TAPE RECORDER

BACKGROUND OF THE INVENTION

This invention relates to a tape recorder capable of detecting by the stopping of reel shaft rotation that a tape end is reached.

In a conventional tape recorder the reaching of a tape end is detected by no generation of an electric or magnetic pulse resulting from the stopping of reel shaft rotation. Such electric or magnetic pulse is not used for any purpose other than the purpose of an end-of-tape detection. The tape counting is carried out by a mechanical means or through utilization of an electric signal other than an end-of-tape detection pulse. In such a known tape recorder there exists no relation between the end-of-tape detection and the count of the tape and these operations are effected by mutually independent mechanisms. As a result, the arrangement becomes complicated and moreover it is impossible to positively reset the tape counter at the end of a tape.

SUMMARY OF THE INVENTION

It is accordingly an object of this invention to provide a tape recorder capable of positively resetting a counter at the end of a tape.

In order to attain this object, an electric or magnetic pulse is used not only for the end-of-tape detection but also as an input signal into a tape counter.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

One preferred embodiment of this invention will be explained below by referring to the accompanying drawing.

Figure 1:
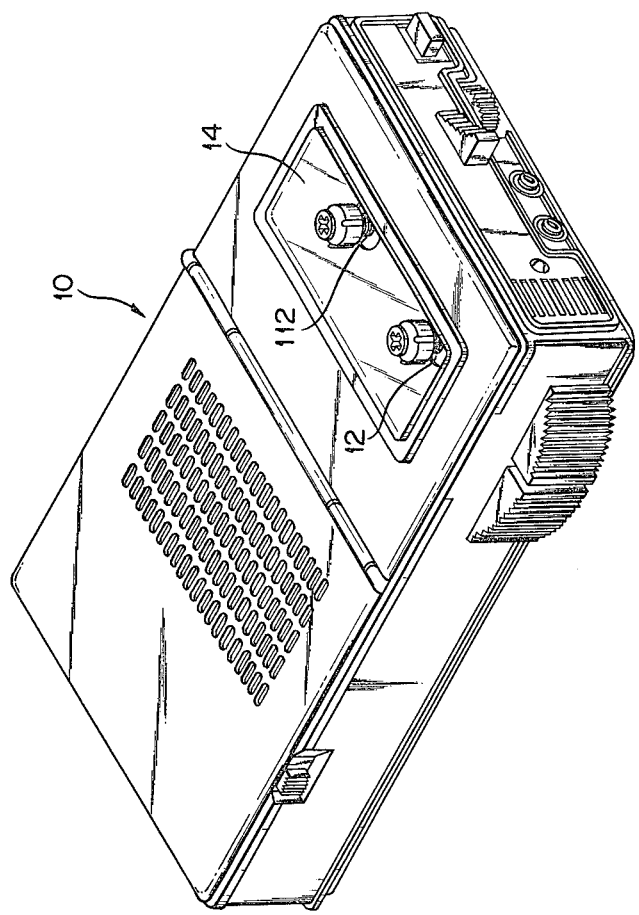
FIG. 1 is a schematic perspective view showing a tape recorder according to this invention.
Figure 2:
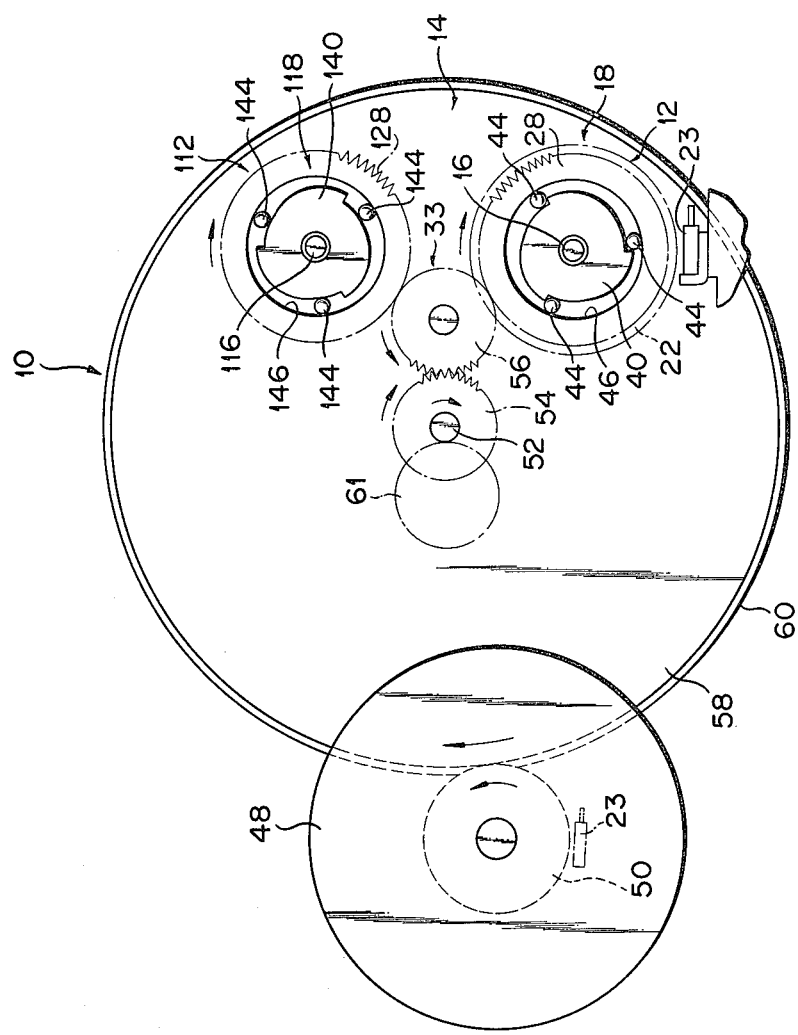
FIG. 2 is a schematic plan view showing the relationship between a reel mechanism and a motor.

As shown in FIGS. 1 and 2 a tape recorder 10 according to this invention comprises a reel mechanism 14 having a pair of reel rests 12, 112. The reel rests 12, 112 act as a tape feed or tape takeup member according to the rotation direction of a motor. Description will now be given below of the reel rest 12 which acts, for example, as a tape feed member at the time of the forward run of a tape.

Figure 3:
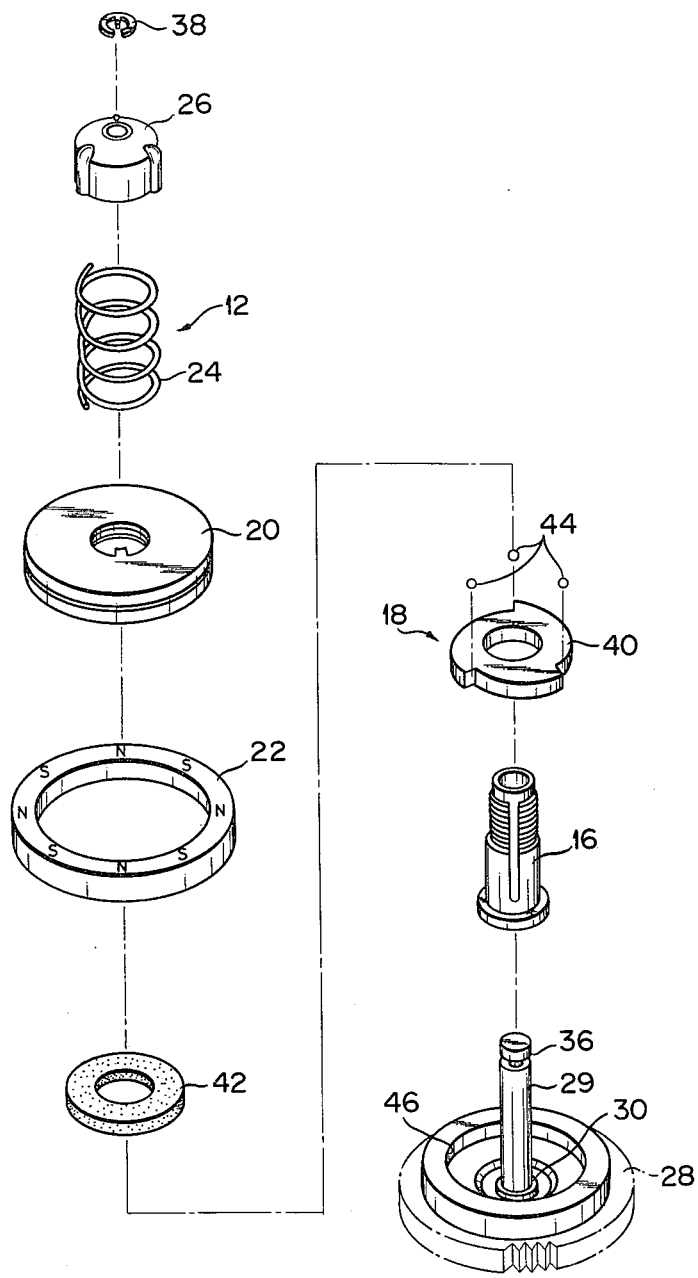
FIG. 3 is an exploded, perspective view showing a reel rest of FIG. 1.
Figure 4:
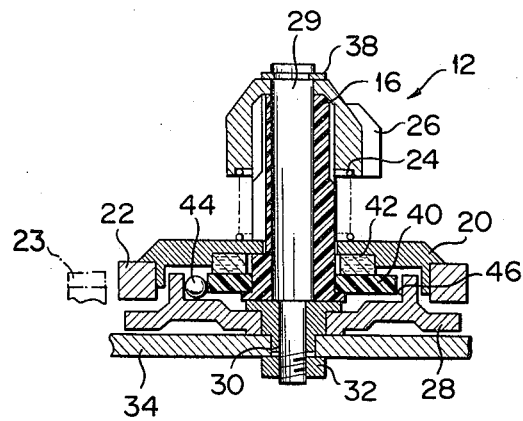
FIG. 4 is a longitudinal cross-sectional view showing in assembled state the reel rest of FIG. 3.

As seen from FIGS. 3 and 4 the reel rest 12 includes an externally threaded and flanged reel shaft 16 having an axially extending slit, and a reel base 20 having a key engageable with the slit of the shaft and fitted to the reel shaft 16 through one-way clutch means 18. A magnetic ring 22 for generating pulses is fitted around the peripheral wall of the reel base 20 and has alternately arranged S and N poles. A magnetism sensitive element 23 is disposed opposite to the magnetic ring 22 to sense a variation in magnetic force from the magnetic ring 22. A drive pawl 26 is engaged with the externally threaded portion of the reel shaft 16 and urged by a compression spring 24. The reel shaft 16 is loosely fitted around the outer surface of a gear shaft 29 of a reel gear 28 which constitutes part of the later described power transmission mechanism. The reel gear 28 is fixed to the gear shaft 29 by means of a collar 30. The reel rest 12 is fixed to a movable chassis 34 by engaging a nut 32 with the externally threaded portion of the lower end section of the shaft 29. A snap-ring 38 is fitted over an annular groove 36 formed in the outer wall of the free end of the gear shaft 29 so that the reel base 20 is mounted on the reel shaft 16.

One-way clutch means 18 comprises a clutch plate 40 having three notches equiangularly spirally formed on the outer periphery thereof, a felt plate 42 disposed between the clutch plate 40 and the reel base 20, and three steel balls 44 placed in the three notches respectively of the clutch plate 42. The steel balls 44 are formed to have such a dimension that they can be moved in a free space defined between the inner wall 46 of the reel gear 28 and each notch of the clutch plate 40.

The reel rest 112 acting, for example, as a tape takeup member has the same construction as the reel rest 12 (in this case at the tape feed side) except that the spiral notches of the clutch plate 140 extend in the opposite direction to those of the clutch plate 40 of the reel rest 12 and that the magnetic ring 22 is omitted. The component parts of the reel rest 112 are denoted with a series number of 100 added to the corresponding component parts of the reel rest 12.

The rotation torque of a motor 48 is transmitted by means of a motor pulley 50 (FIG. 2) to a capstan shaft 52 and reel shafts 16, 116 through a motive power-transmitting mechanism 33 including a gear train, without passing through an idler lever etc. as is the case with the prior art automatic reverse tape recorder. As shown in FIG. 2 the motive power-transmitting mechanism 33 includes a capstan gear 54 fitted over a capstan shaft, a pair of reel gears 28, 128 fitted over the reel shafts 16, 116 respectively, and an intermediate gear 56 located between the reel gear 28 and the reel gear 128. The rotation torque of the motor 48 is transmitted by means of the motor pulley 50 to the capstan shaft 52 through a flywheel and thence to the reel gears 28, 128 through the capstan gear 54 and intermediate gear 56. A rubber tire 60 is fitted over the rim of the flywheel 58. Reference numeral 61 shows a pinch roller.

When the pulley 50 of the motor 48 is rotated counterclockwise as shown in FIG. 2 the capstan shaft 52 and reel gears 28, 128 are all rotated clockwise. When in the reel rest 12 the reel gear 28 is rotated clockwise the steel balls 44 run toward a larger space portion and are idly rotated between the inner wall 46 of the reel gear and the clutch plate 42, giving rise to no friction therebetween. As a result, the clutch plate 40 and thus the reel base 20 and reel shaft 16 are not rotated. When in the takeup reel rest 112 the steel balls 144 are moved toward a narrower space portion they are tightly contacted with the inner wall 146 of the reel gear 128 to cause a wedging action therebetween. In consequence, a frictional force is produced between the inner wall 146 of the reel gear 128 and the clutch plate 140 to cause the clutch plate 140 to be rotated clockwise. The rotation of the clutch plate 140 causes the rotation of the reel base 120 through a felt plate 142. As a result, the tape is wound by the reel rest 112.

When the motor pulley 50 is rotated clockwise (not shown) the clutch plate 40, reel base 20 etc. are rotated by a reverse operation which is different from the above-mentioned operation. In this case, the tape is wound by the tape rest 12. Although the pulse generating magnetic ring 22 is fitted around the peripheral wall of the reel base 20 the motor pulley 50 can be made of a magnetic material so that it can also act as a magnetic ring. By so doing, a lesser number of parts can be used and, moreover, the tape recorder 10 is easier to assemble. In this case, it is needless to say that the magnetism sensitive element 23 is located adjacent to the motor pulley 50 as shown in FIG. 2.

Although in the above-mentioned embodiment the reel gears 28 and 128 corresponding to the tape takeup and feed reel rests 12 and 112 respectively are rotated at the same time using the power-transmitting mechanism 26 including, the capstan gear 54, intermediate gear 56 and reel gears 28, 128, the use of the one-way clutch means 18, 118 permits only the reel rest 12 or 112 acting as a tape takeup member to be rotated. If, therefore, the rotation direction of the single motor 48 is reversed the forward or reverse run of a tape can be easily assured.

Figure 5:
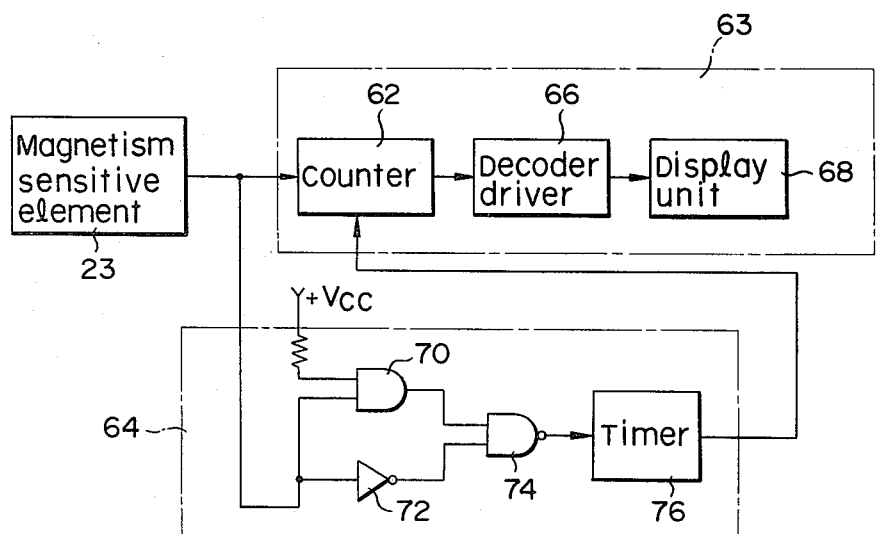
FIG. 5 is a block circuit diagram in which a pulse signal is used as an input signal to a tape counter.

The magnetism sensitive element 23 produces a pulse of predetermined duration in response to a change in the magnetic force from the magnetic ring 22 and, when the end of the tape is reached, the reel shaft is stopped, causing no change in the magnetic force from the magnetic ring. When this occurs, the element 23 produces a continuous pulse of predetermined level. FIG. 5 shows a block circuit diagram in which a pulse from the magnetism sensitive element 23 is used as an input signal to the tape counter. The pulse from the element 23 is sent to a counter 62 in the tape count circuit 63 and to an end-of-tape detection circuit 64. The input signal is converted by the counter to a binary signal which is sent to a decoder/driver 66 where it is decoded as a 7-segment signal for display on a display unit 68. The display unit 68 displays a numeral value corresponding to an amount of takeup of the tape. The signal so sent to the end-of-tape detection circuit 64 is coupled to an AND gate 70 and an inverter 72. The outputs of the AND gate 70 and inverter 72 are connected to an NAND gate 74. The output of the NAND gate 74 is connected to a timer 76. When pulses of a predetermined cycle which correspond to the number of rotations of the magnetic ring 22 are produced no rest signal is sent to the counter 62 from the timer 76. When, on the other hand, a continuous pulse of predetermined level is produced for a predetermined time period after the end of the tape is reached, a reset signal is sent to the counter 62 from the timer 76, causing the counter 62 to be reset. As a result, a zero is displayed on the display unit 68.

According to this invention a pulse signal which is utilized to detect the end of the tape is also used as an input signal to the tape counter. For this reason, the count of the tape is positively displayed responsive to a normal pulse variation and, when the end of the tape is reached, a continuous pulse of predetermined level is detected so as to assure the positive resetting of the counter.

What is claimed is:

1. A tape recorder having a reel shaft comprising pulse generating means for generating an electric or magnetic continuous pulse during rotation of said reel shaft; and
   an end-of-tape detection circuit including a timer and a tape count circuit including a counter, decoder/driver and display unit and being operatively connected to said pulse generating means and to which said pulse is adapted to be applied as an input signal.

2. A tape recorder according to claim 1 in which said timer of said end-of-tape detection circuit generates a stop signal when said continuous pulse is produced for a determined time period.

3. A tape recorder according to claim 2 in which said counter converts the pulse to a binary signal which in turn is converted by said decoder/driver to a 7-segment signal for display on said display unit.

4. A tape recorder according to any one of claims 1, 3 or 2, in which said pulse generating means includes a magnetic ring having alternately arranged N and S poles and being rotatable with the rotation of the reel shaft, and a magnetism sensitive element disposed adjacent to the magnetic ring and adapted to sense a variation in the magnetic force from the magnetic ring to generate said pulse.

5. A tape recorder according to claim 4 in which said magnetic ring is fitted around the peripheral wall of a reel rest which, together with said reel shaft, is rotatable as one unit.

6. A tape recorder according to claim 4 in which said magnetic ring is formed by a motor pulley forming part of a drive for said tape recorder.

7. A tape recorder according to claim 1 in which said timer of said end-of-tape detection circuit generates a reset signal when the end-of-tape is detected and when said continuous pulse is produced for a determined time period, and said counter of said tape count circuit receives said continuous pulse from said pulse generating means to convert it to a display signal for display on said display unit and said reset signal from said timer to cause itself to be reset to permit a zero indication to be displayed on said display unit.

* * * * *